United States Patent Office 3,377,464
Patented Apr. 9, 1968

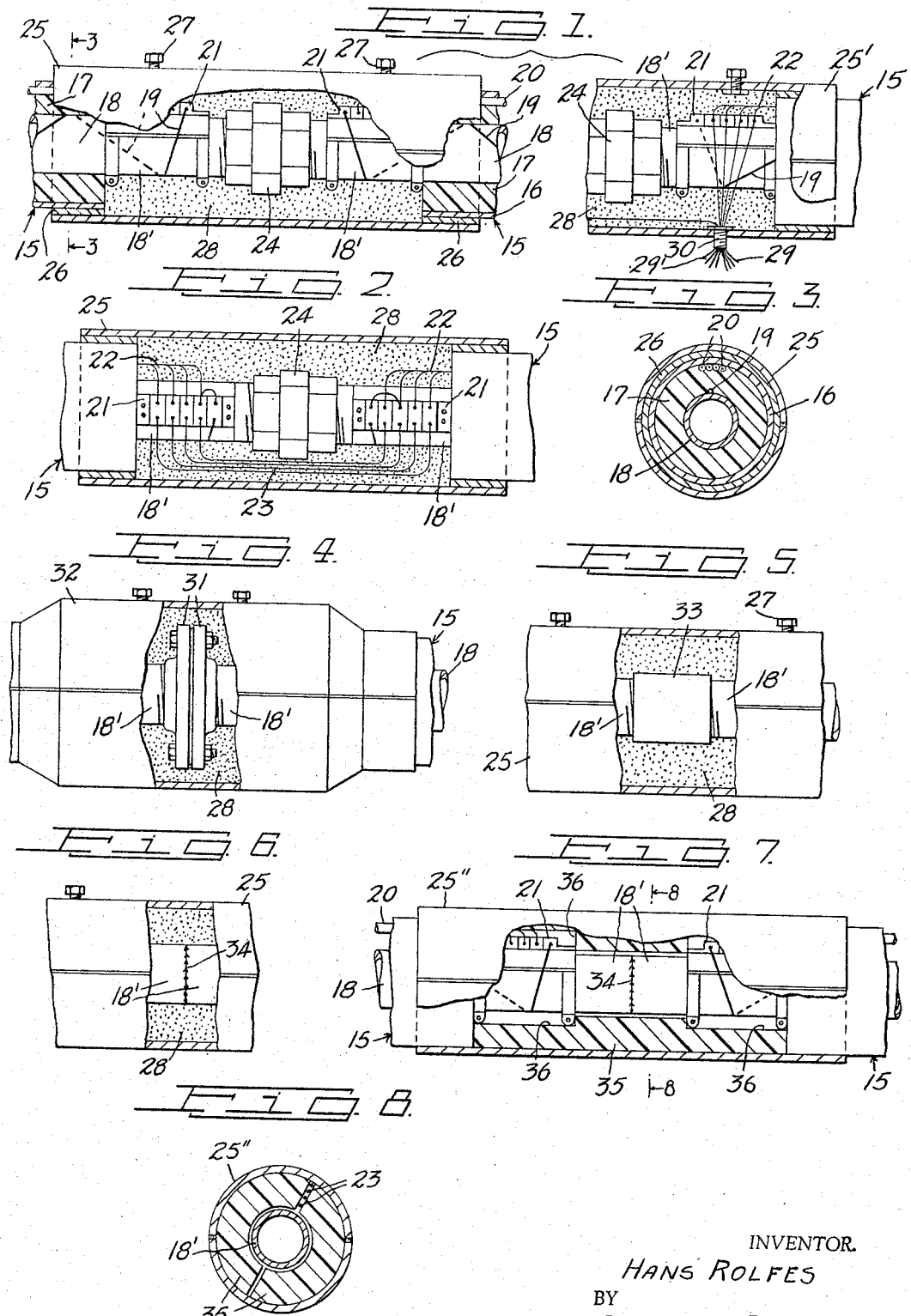

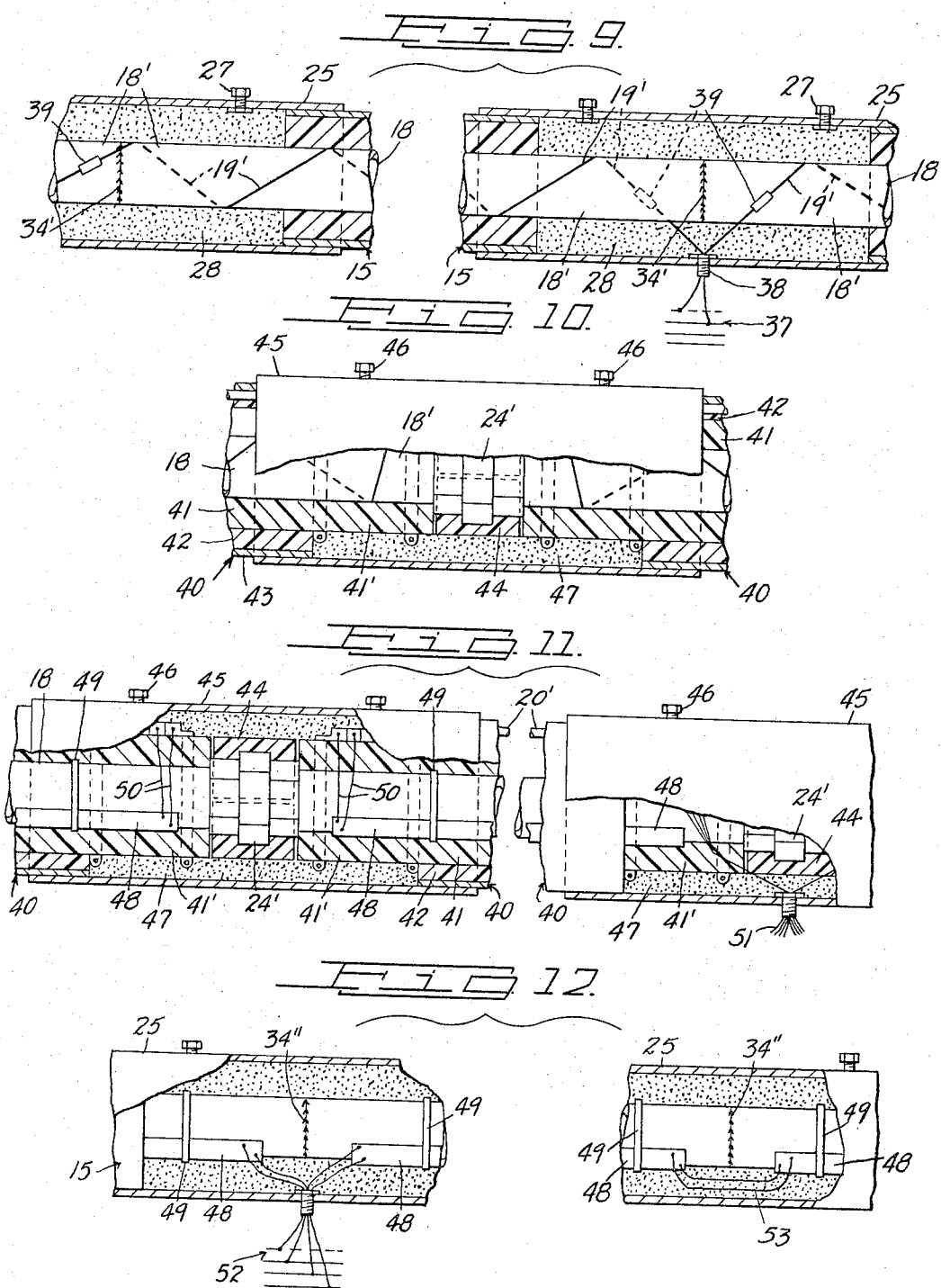

3,377,464
ELECTRIC RESISTANCE HEATING AND INSULATING SYSTEM FOR ELONGATED PIPES
Hans Rolfes, Bronx, N.Y., assignor to Trans Continental Electronics Corp., New York, N.Y., a corporation of New Jersey
Filed June 21, 1965, Ser. No. 465,618
10 Claims. (Cl. 219—301)

ABSTRACT OF THE DISCLOSURE

An electric resistance heating system for elongated pipe units, including coupling stations for the units, wherein electric circuit conduit means is arranged directly upon the pipe of each unit and means is arranged in each unit and extending longitudinally thereof for conducting an electric circuit to the circuit conduit means and, wherein, predetermined stations include means for admitting a source of current supply to the system. Further, the coupling stations include means for coupling the electric circuits for each unit and various types of pipe couplings joining the pipes of adjacent units. The electric circuit conduit means may comprise a suitable resistance wire spirally wound on the pipe or an electric resistance heating tape extending longitudinally of the pipe.

---

The invention relates to the heating and insulating of pipes, through which fluid mediums are circulated. More particularly, the invention deals in a system, wherein an electric resistance in the form of a wire or tape is wound or otherwise arranged longitudinally of the pipe to be heated and, wherein, the source of electric supply is either carried within the pipe insulation or is arranged externally of the insulation. Still more particularly, the invention deals with a system of the character defined employing various types of pipe couplings in joining elongated preformed pipe sections of predetermined lengths.

The novel features of the invention will be best understood from the following description, when taken together with the accompanying drawing, in which certain embodiments of the invention are disclosed and, in which, the separate parts are designated by suitable reference characters in each of the views and, in which:

FIG. 1 is a bracketed view illustrating one type of system and two different coupling stations of the system, parts of the construction being shown in elevation.

FIG. 2 is a detail sectional plan view of the coupling shown at the left of FIG. 1.

FIG. 3 is a diagrammatic section on the line 3—3 of FIG. 1.

FIGS. 4, 5 and 6 are detail views partially in section, diagrammatically illustrating varied types of couplings which can be used and omitting the circuitry in simplifying these illustrations.

FIG. 7 is a partial sectional view, generally similar to the showing at the left of FIG. 1, but illustrating a pipe coupling, as in FIG. 6, in showing a prefabricated joint or coupling insulation.

FIG. 8 is a diagrammatic section on the line 8—8 of FIG. 7.

FIG. 9 is a bracketed sectional view, generally similar to FIG. 1, but showing pipe couplings as in FIG. 6 and illustrating an outside portion of power supply at predetermined spaced couplings, part of the construction being shown in elevation.

FIG. 10 is a view, generally similar to the showing at the left of FIG. 1, but illustrating an additional layer of insulation in the prefabricated pipe section in providing added insulation where high temperatures are employed.

FIG. 11 is a bracketed view, generally similar to FIG. 1, but illustrating the use of resistance tapes as the heating medium, with the source of power carried within the insulation of the respective pipe units; and FIG. 12 is a bracketed view illustrating the use of an outside power source of supply to the resistance tapes, with jumpers at predetermined couplings and further showing pipe couplings of the type illustrated in FIG. 6.

Considering FIGS. 1 to 3, inclusive, in these views one type of system which I employ is diagrammatically illustrated. At 15 I have shown prefabricated insulating sections or units, comprising an outer tubular casing 16 of waterproof material and such materials, for example, as extruded polyvinylchloride can be used. Arranged within the casing 16 is a suitable insulating material 17 which is foamed in place or, in other words, can be poured at the shop and such materials as polyurethane can be used. Arranged within the insulation 17 is an electrically conductive pipe 18, upon which a suitable resistance wire 19 is wound. Also arranged within the unit 15 or the insulation 17 thereof is a conduit or duct 20 for the electric power supply and preferably made of plastic material.

It will appear, from a consideration of both showings in FIG. 1, that the pipe 18 projects at each end of the respective units, as seen at 18', and mounted on these ends by straps or otherwise are terminal blocks 21.

Considering the diagrammatic showing of FIG. 2 of the drawing, the wires 22 from the conduits 20 extend to various terminals of the blocks 21 and jumper connections 23 extend between the block 21 of one section to the block 21 of the adjacent section in completing the circuitry throughout the various coupled sections. The pipe ends 18' in the showings in FIGS. 1 and 2 of the drawing are coupled by pipe unions 24.

In the system, a plurality of coupling stations are employed. With the station at the left of FIG. 1, a split coupling sleeve 25 is employed, this being installed at the field of installation where the system is to be laid. The sleeve 25 is preferably made of the same material as the casing 16 and the parts are cemented or welded together, preferably upon rings 26 at ends of the sleeve. After the coupling has been made, suitable foam insulation, which can be generally similar to the insulation 17, is poured or otherwise fed into the coupling sleeve 26 through filling nipples, diagrammatically seen at 27 and, in order to distinguish clearly the prefabricated insulation 17 from the field formed insulation within the sleeve 25, this insulation is diagrammatically illustrated by the stippling at 28. In this manner, a clearer understanding of the system and formation thereof will be apparent.

At the right of FIG. 1 is diagrammatically shown at 29 circuit wires from a suitable power source extending into the system. This will be at predetermined spaced intervals along the entire lay of the respective units, the wires passing through a suitable nipple 30, the wires from the adjacent system, at the left of this showing, also passing through the nipple 30, as diagrammatically seen at 29'. The sleeve 25' of the showing at the right in FIG. 1 differs only from the sleeve 25 in inclusion of the nipple 30. Otherwise, the showing of the respective parts at the right of FIG. 1 will employ common reference characters as those shown at the left of FIG. 1 as the structures are identical. The arrangement of the various conduits 20 within the casing 15 and the insulation 17 are diagrammatically illustrated in FIG. 3 of the drawing.

In FIG. 4 of the drawing is illustrated a modified form of coupling between the pipe ends 18'. Here a pipe flange structure, as at 31, is employed. By virtue of the dimensions of the flange coupling 31, an enlarged coupling sleeve 32, generally of the form shown in FIG. 4, will be employed. In this figure, as well as in the showings in FIGS. 5 and 6 of the drawing, the circuit wires are not illustrated. It will be understood that this structure will be the same as that illustrated in FIGS. 1 and 2 of the drawing.

In FIG. 5 of the drawing, the pipe ends 18' are joined by a pipe coupling 33, as diagrammatically shown. In FIG. 6 of the drawing, the pipe ends 18' are simply welded together, as diagrammatically seen at 34. At this time, it is pointed out that, in the prefabrication of the units 15, the pipe ends 18' will be made of the length and structure to adapt them to the couplings employed in any one installation.

In FIGS. 7 and 8 of the drawing, a slight modification of the structure shown in FIG. 1 is employed, wherein preformed rigid high temperature insulation is employed for field use, this insulation being in the form of a two-part sleeve 35, note FIG. 8, parts of the sleeve 35 being recessed, as at 36, FIG. 7, to receive the terminal blocks and the wires extending thereto, as well as the means for mounting the terminal blocks on the pipe ends 18'. As the blocks 21 are of the same structure as that shown in FIG. 1 of the drawing, like references have been employed. Considering FIG. 8 of the drawing, it will appear that the jumper wires 23 are arranged between adjacent surfaces of the parts of the sleeve 35. It will further be apparent that the outer sleeve 25" distinguishes from the sleeves 25, 25' in omitting the nipples 27. Further, in FIG. 7, the use of the sealing rings are dispensed with, as at 26 FIG. 1.

The illustration in FIG. 9 differs primarily from the showing in FIGS. 1 to 3, inclusive, in utilizing the outside source of power supply, as diagrammatically seen at 37, which passes through a nipple 38 and extends to the wires 19' wound around the pipes 18. With this construction, wire connectors, as at 39, can be employed where the separate units or sections are coupled together. Here, it is pointed out that a certain number of pipe sections can be connected in series to make up standard voltages for the heating wire. In the illustration in FIG. 9, the pipe ends 18' are welded together, as at 34'.

FIG. 10 of the drawing shows a slight variation of the structure shown in FIGS. 1 to 3, inclusive, first, in the formation of the units or sections 40, which differ from 15 primarily in providing on an inner insulation 41 an outer insulation 42 of a higher temperature rating, particularly when a higher degree of heat is being utilized in heating the pipe 18. It will be apparent that the insulation 42 stops at the end of the outer casing 43 of the units 40; whereas, the insulation 41 extends onto the pipe ends 18', as seen at 41'. Thus, it will be apparent that the terminal blocks, as at 21, FIG. 1, of the drawing, are mounted directly upon the extension 41'. This will be apparent from a consideration of FIG. 11 of the drawing illustrating a slight modification over the showing in FIG. 10.

The second variation in the structure of FIG. 10 resides in the use of a preformed two-part insulating sleeve 44 directly over the coupling 24', similar to the coupling 24, 44 being fashioned to conform with 24', similar to the formation of the insulation 35'. Thus, in the final assemblage and completion of the coupling between adjacent units 40 within the coupling sleeve 45, similar to 25, the final insulation injected through the nipples 46 will be arranged, as indicated by the stippling 47, on 41', 44 and between the spaced ends of 42 and 43.

The showing in FIG. 11 modifies the structure in FIG. 10 simply in substituting for the wire round directly upon the pipe 18, as in FIG. 10, electric resistance heating tape 48 extending longitudinally of the pipes 18 and periodically held thereon by suitable straps, as diagrammatically seen at 49. Circuit wires 50 extend from the tape ends to the terminal blocks, the source of supply to the circuit wires being internal, as by conduits 20', similar to the showing in FIG. 1 of the drawing.

At predetermined intervals, a source of supply to the conduits 20' is provided, as diagrammatically seen at 51 at the right of FIG. 11, this being similar to the source of supply as shown at the right of FIG. 1; thus no further description is deemed to be essential. As the component parts of FIG. 11 are otherwise the same as that shown in FIG. 10, like references will designate like parts.

In FIG. 12 of the drawing is shown a modified adaptation of the showing in FIG. 11, wherein the source of current supply to the tapes 48 is external, as diagrammatically seen at 52, and in this showing the pipe ends are welded together, as at 34". At the right of FIG. 12, the jumper connection between tape ends of adjacent units is diagrammatically seen at 53. In FIG. 12, the general type of units or sections 15 will be employed, as well as the coupling sleeves 25. However, when greater insulation is required, the type of units or sections shown at 40 in FIG. 11 can be employed.

In the respective showings of the couplings between the separate units, it will be understood that any type of pipe coupling, such as shown in FIG. 1 or in FIGS. 4, 5 and 6 of the drawing, can be employed and, in several of the views as, for example, FIGS. 7, 9 and 12, a simple welded coupling is shown to minimize the illustration.

Systems of the type and kind under consideration can be utilized in effectively heating at varied temperatures fluid mediums passing through the pipes of the coupled units or sections. By prefabricating the basic units, the coupling of the units at the place of installation can be quickly and easily performed.

Having fully described my invention, what I claim as new and desire to secure by Letters Patent is:

1. A system of the character defined comprising a plurality of insulated pipe units united in spaced coupling stations, each unit comprising an outer casing, a pipe within said casing, the pipe having ends projecting beyond ends of said casing, means insulating the pipe in the casing, each of said stations comprising split sleeves supporting insulating means enveloping the pipe ends and means coupling the pipe ends at said station, electric circuit conduit means extending longitudinally of and directly contacting the pipe of each unit for heating a medium passing through the pipe of the system, means coupling the last named means of each unit at predetermined coupling stations, means arranged in and extending longitudinally of the unit for conducting an electric circuit to said fourth named means, means at predetermined stations for admitting a source of electric current supply to the unit, and said fifth named means comprising terminal blocks supported on the pipe ends of predetermined adjacent units with circuit wires connecting the terminal blocks of adjacent units.

2. A system as defined in claim 1, wherein the first named means comprises two insulating bodies, and one of said insulating bodies extending onto the pipe ends beyond ends of the casing of each unit.

3. A system as defined in claim 1, wherein the second named means includes split prefabricated insulations.

4. A system as defined in claim 1, wherein the second named means includes, in part, split prefabricated insulations.

5. A system as defined in claim 1, wherein said third named means comprises a pipe union.

6. A system as defined in claim 1, wherein said third named means comprises a pipe flange.

7. A system as defined in claim 1, wherein said third named means comprises a pipe coupling.

8. A system as defined in claim 1, wherein said third named means comprises a weld.

9. A system as defined in claim 1, wherein said fourth named means comprises a circuit wire spirally wound on the pipe of each unit.

10. A system as defined in claim 1, wherein said fourth named means comprises a conductor tape supported on the pipe of each unit.

References Cited

UNITED STATES PATENTS

| | | | |
|---|---|---|---|
| 1,237,862 | 8/1917 | Bintliff | 219—207 X |
| 1,806,942 | 5/1931 | Hendricks | 219—535 X |
| 2,686,109 | 4/1954 | Moule. | |
| 2,761,949 | 9/1956 | Colton | 219—300 |
| 2,894,538 | 7/1959 | Wilson | 138—149 X |

FOREIGN PATENTS

| | | |
|---|---|---|
| 847,074 | 6/1939 | France. |
| 527,759 | 10/1940 | Great Britain. |
| 962,180 | 7/1964 | Great Britain. |
| 44,565 | 6/1908 | Switzerland. |

ANTHONY BARTIS, *Primary Examiner.*